United States Patent
Nessi et al.

(10) Patent No.: US 9,422,991 B2
(45) Date of Patent: Aug. 23, 2016

(54) CALIPER ASSEMBLY FOR SERVICE AND PARKING DISC BRAKE

(71) Applicant: Freni Brembo S.p.A., Curno, Bergamo (IT)

(72) Inventors: Lorenzo Nessi, Curno (IT); Adriano Bonetti, Curno (IT); Cristian Crippa, Curno (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 14/379,238

(22) PCT Filed: Feb. 15, 2013

(86) PCT No.: PCT/IB2013/051248
§ 371 (c)(1),
(2) Date: Aug. 15, 2014

(87) PCT Pub. No.: WO2013/121395
PCT Pub. Date: Aug. 22, 2013

(65) Prior Publication Data
US 2015/0021125 A1    Jan. 22, 2015

(30) Foreign Application Priority Data
Feb. 16, 2012  (IT) ............................... MI2012A0232

(51) Int. Cl.
*F16D 55/228*    (2006.01)
*F16D 55/226*    (2006.01)
(Continued)

(52) U.S. Cl.
CPC ............ *F16D 55/226* (2013.01); *F16D 55/228* (2013.01); *F16D 2055/0008* (2013.01);
(Continued)

(58) Field of Classification Search
CPC ..... F16D 55/227; F16D 55/226; F16D 65/14; F16D 55/2255
USPC .............. 188/72.5, 72.7, 73.31, 106 F, 196 M
See application file for complete search history.

(56) References Cited

U.S. PATENT DOCUMENTS

| 3,182,755 A | 5/1965 | Campagnolo |
| 4,762,206 A * | 8/1988 | Arimitsu ........... F16D 55/22655 188/73.31 |
| 4,993,519 A * | 2/1991 | Thioux ............... F16D 55/2265 188/71.3 |

FOREIGN PATENT DOCUMENTS

| DE | 1 430 705 A1 | 11/1968 |
| DE | 10 2008 034 300 A1 | 1/2010 |
| WO | WO 2007/039922 A1 | 4/2007 |

*Primary Examiner* — Robert A Siconolfi
*Assistant Examiner* — Mahbubur Rashid
(74) *Attorney, Agent, or Firm* — Blank Rome LLP (57) ABSTRACT

A caliper assembly for a service and parking disc brake (1) comprising a service caliper body (2) placed astride a disc for a disc brake having a first and second elongated element on the vehicle side (4), a first service pad (8) to abut it against a first braking surface of the disc and exercise a service braking action on the vehicle, said first elongated element (4) comprising a first abutment and guide pin (16) of the first pad (8) to guide it and receive the braking action of the vehicle, a parking caliper (17) comprising separate thrust means (20) of the parking caliper and for abutting at least a third parking pad (21) against the first braking surface of the disc, said parking caliper (17) has a connection (18) for supporting and connecting at least partially said parking caliper (17) to said service caliper body (2), said connection (18) of the parking caliper (17) to the service caliper body (2) comprises a first blocking screw (19) positioned coaxially to said first support and guide pin (16) of the first service pad (8).

7 Claims, 11 Drawing Sheets

(51) Int. Cl.
 F16D 55/00 (2006.01)
 F16D 121/04 (2012.01)
 F16D 123/00 (2012.01)

(52) U.S. Cl.
 CPC . *F16D2055/0016* (2013.01); *F16D 2055/0091* (2013.01); *F16D 2121/04* (2013.01); *F16D 2123/00* (2013.01)

CALIPER ASSEMBLY FOR SERVICE AND PARKING DISC BRAKE

FIELD OF THE INVENTION

The present invention relates to a service and parking caliper assembly.

In particular the present invention relates to an assembly comprising a caliper body of the type placed astride a disc, and having thrust pistons of a pad positioned on both the opposite sides of the braking surfaces of a disc for a disc brake and also a parking caliper body connected to said fixed caliper body.

STATE OF THE ART

From the document EP 1 924 782-B1 in the name of the same Applicant a service and parking caliper assembly is known of in which the service caliper is of the fixed type and the parking caliper is of the floating type and comprising a fixed bracket with the body of the service caliper and a floating portion moving in relation said bracket. This solution is not always applicable on account of its considerable circumferential or tangential dimensions, above all when destined for applications to sports cars having brake discs of considerable dimensions which do not leave much space between them and the inside of the wheel rim to house a brake caliper of considerable dimensions.

Moreover, the need is particularly felt to have a service caliper to which a parking caliper is joined not just having reduced dimensions but also a more limited weight precisely for those demanding applications such as those of sports cars, where the aim is always to reduce the weight of the unsuspended masses, such as, namely, the brake disc caliper.

From the document US 2005/000757-A1 in the name of PER Australia PTY Ltd. a service brake is known of wherein the pad suitable for abutting against the braking surfaces of the disc is operated both by service operating means and parking operating means. In this solution therefore the same brake caliper structure is used both for service purposes and parking purposes. This solution is only adequate for vehicles with low performance or of very limited weight, since in the case of demanding applications it requires oversized parking operating means so as to exert on the ample area of the service pads a sufficient braking action to ensure adequate parking of the vehicle. Consequently, contrary to what may appear, this type of solution would prove extremely demanding in the case of applications to high performance or very heavy vehicles leading to an extremely oversized scaling of the parking operating means thus making them cumbersome and heavy.

An analogous solution is known from the document WO 88/04741 in the name of Allied Corporation, which has the same drawbacks as the aforementioned solution in US 2005/000757.

The document U.S. Pat. No. 4,784,241-A1 in the name of Allied-Signal Inc. illustrates a braking system composed of a service caliper associated to a drum for a parking brake drum. This solution proves suitable for low performance vehicles and occupies considerable space.

Solution

The purpose of the present invention is therefore to excogitate and make available a service and parking caliper assembly which makes it possible to produce a compact but at the same time efficient and robust solution especially in the case of demanding and extremely demanding applications, such as for example for sports cars or particularly heavy vehicles.

It is also the purpose of the present invention to excogitate a caliper assembly for a service and parking disc brake which has structural and functional characteristics such as to satisfy the aforesaid requirements while at the same time obviating the drawbacks of the aforementioned documentation of the state of the art.

Such problem is resolved by a caliper assembly for a service and parking disc brake as defined in the appended claim 1.

According to a general embodiment of the invention, a caliper assembly for a service and parking disc brake comprises a service caliper body placed astride a disc for a disc brake having a first elongated element on the vehicle side suitable for facing a first braking surface of the brake disc, said elongated first element comprises at least a first cylinder which houses a first thrust piston suitable for exercising a thrust action on a first service pad side to abut it against a first braking surface of the disc and exercise a service braking action on the vehicle.

Advantageously, said first elongated element comprises at least a first abutment and guide pin of the first service pad to guide and receive the service braking action of the vehicle.

Advantageously said service caliper body comprises a second elongated element on the wheel side suitable for facing a second braking surface of the brake disc. Said second elongated element comprises at least a second cylinder which houses a second thrust piston suitable for exercising a thrust action on a second service pad side to abut it against a second braking surface of the disc and exercise a service braking action on the vehicle.

Of further advantage, said service caliper body comprises in addition a first bridge suitable for positioning itself astride the disc and connecting said first elongated element on the vehicle side to said second elongated element on the wheel side.

Said assembly further comprises a parking caliper having separate thrust means of the parking caliper distinct from the first cylinder and second cylinder of the service caliper body and suitable for abutting at least a third parking pad against the first braking surface of the disc.

Particularly advantageously said parking caliper has a connection for supporting and connecting at least partially said parking caliper to said service caliper body.

Preferably, said connection between the parking caliper and the service caliper body comprises a first blocking screw positioned coaxially to said first support and guide pin of the first service pad.

Such solution makes it possible to obtain a service caliper with an integrated parking caliper while keeping the dimensions of the assembly extremely compact even in the case of extremely stringent applications such as those for sports cars or very heavy vehicles.

Thanks to the solution proposed the number of components can be limited and the construction, assembly and even maintenance operations of the assembly can be simplified.

DRAWINGS

Further characteristics and advantages of the service and parking caliper assembly according to the invention will, in any case, be evident from the description given below of its preferred embodiments, made by way of a non-limiting example with reference to the appended drawings, wherein.

DESCRIPTION OF SOME PREFERRED EMBODIMENTS

Figure 1:
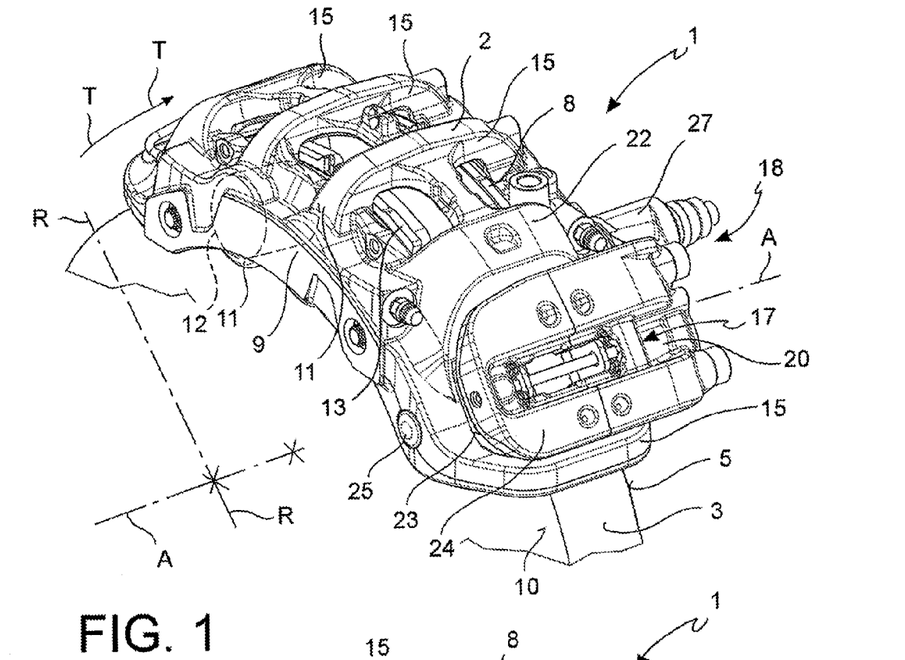
FIG. 1 shows, in an axonometric view from the wheel side, a service and parking caliper assembly.
Figure 2:
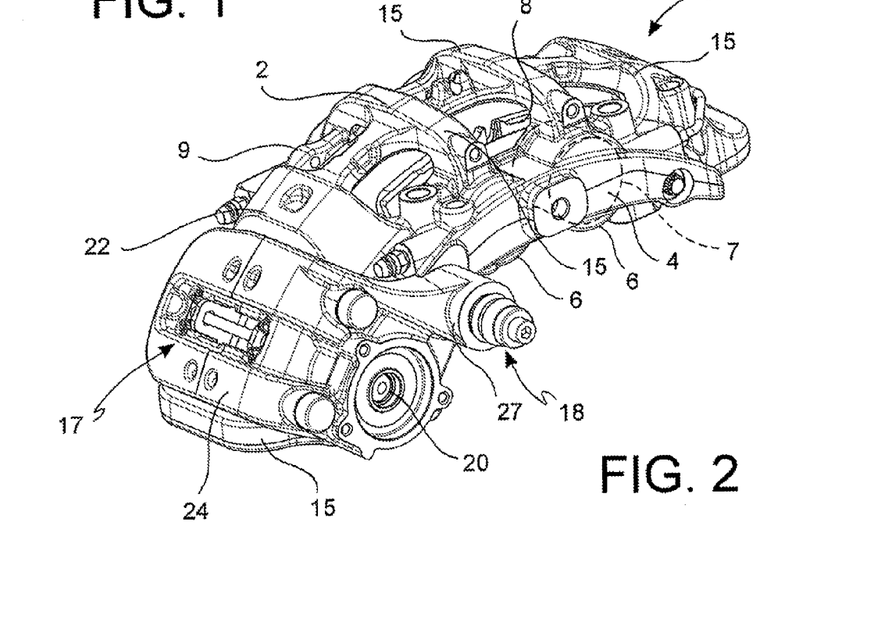
FIG. 2 shows, in an axonometric view from the vehicle side, the assembly in FIG. 1.
Figure 3:
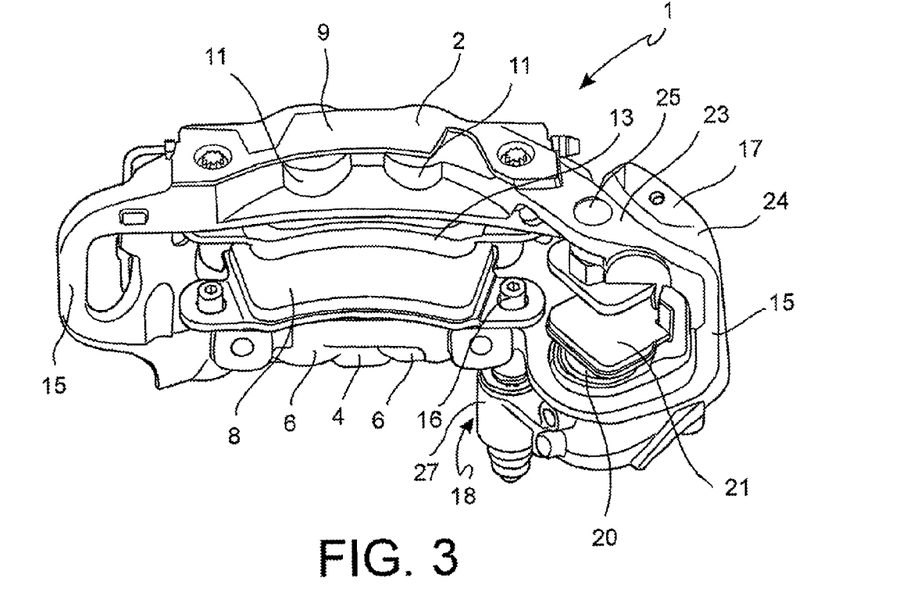
FIG. 3 shows, in an axonometric view from the axis of the associable disc, the assembly in FIG. 1.
Figure 4:
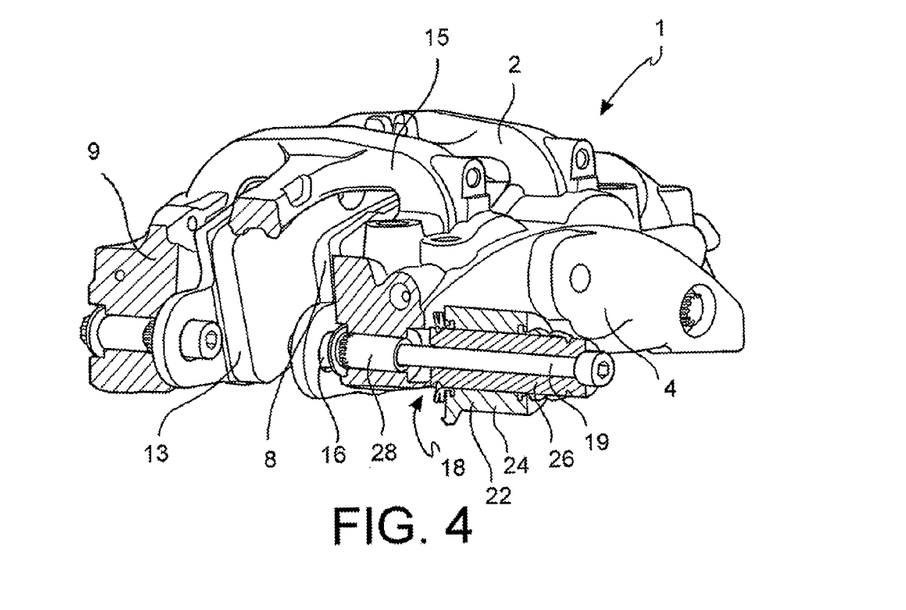
FIG. 4 shows, in a cross-section axonometric view, the assembly in FIG. 1 sectioned at the point of the guide and abutment pin of the first pad coaxial to the blocking screw of the floating caliper.
Figure 5:
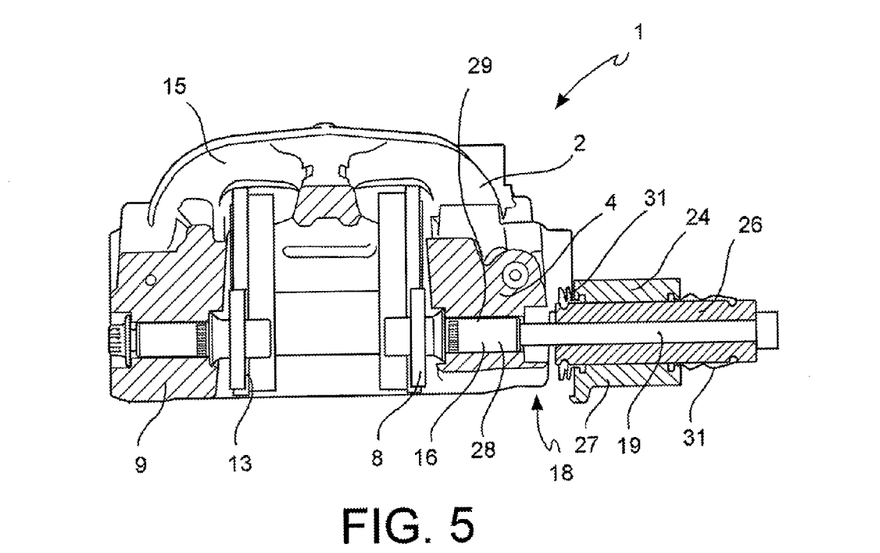
FIG. 5 shows a front view of the cross-section of FIG. 4.
Figure 6:
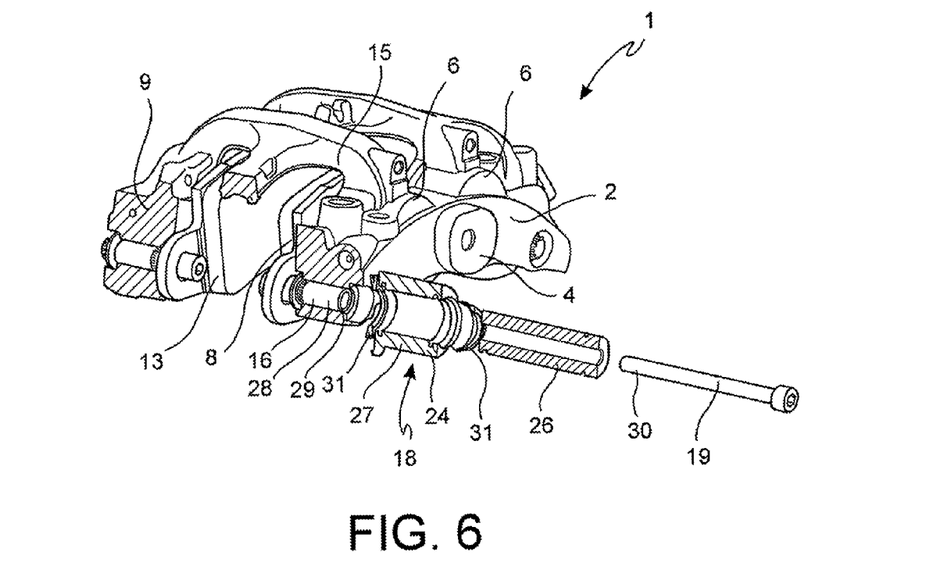
FIG. 6 shows the assembly in FIG. 4 in cross-section and in separate parts.
Figure 7:
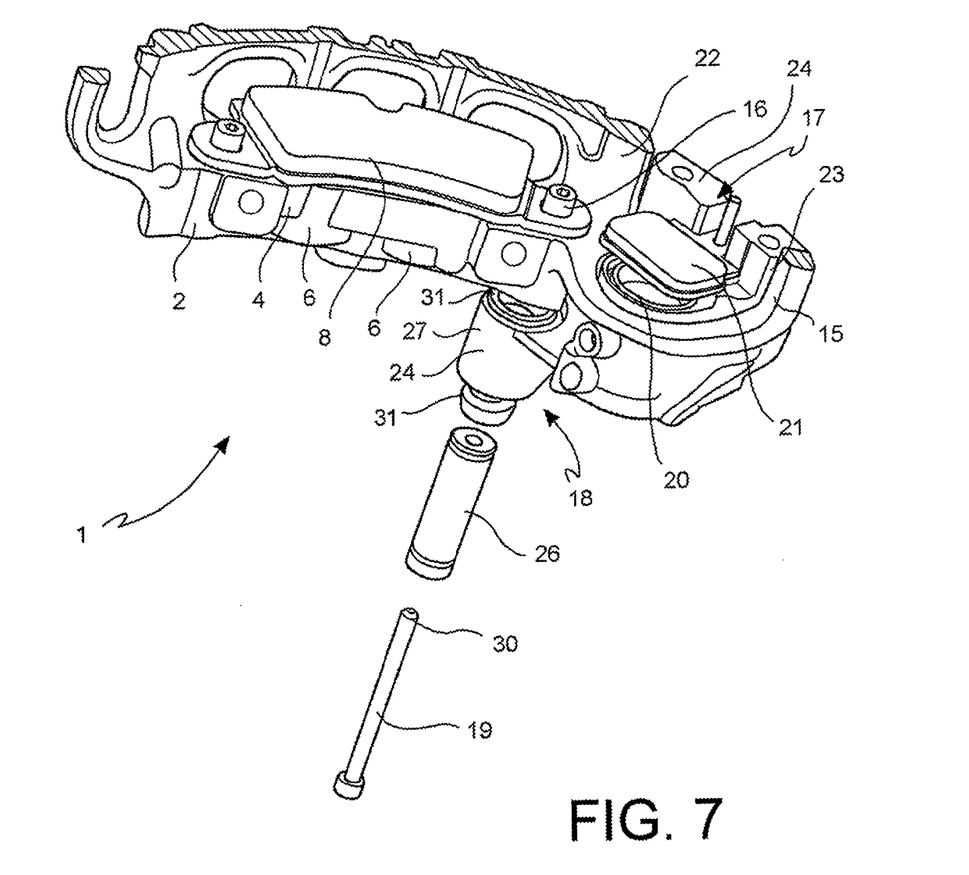
FIG. 7 shows in an axonometric view the assembly in FIG. 1 sectioned substantially in the centreline along a tangential plane parallel to the braking surfaces of the disc and with the components of the connection between the parking caliper and the fixed caliper body in separate parts.
Figure 8:
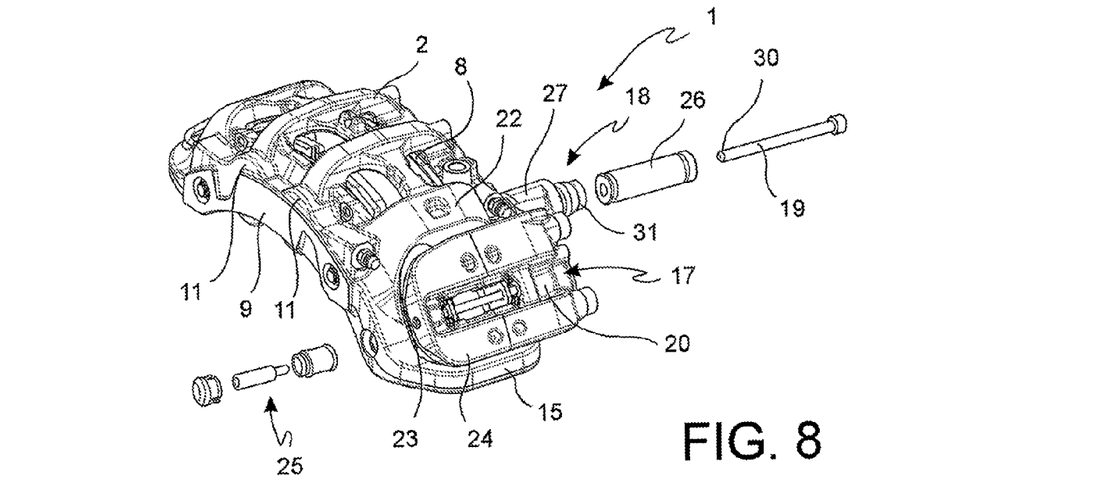
FIG. 8 shows, in an axonometric view from the wheel side, the assembly in FIG. 1 with the connection between the parking caliper and fixed caliper body in separate parts.
Figure 9:
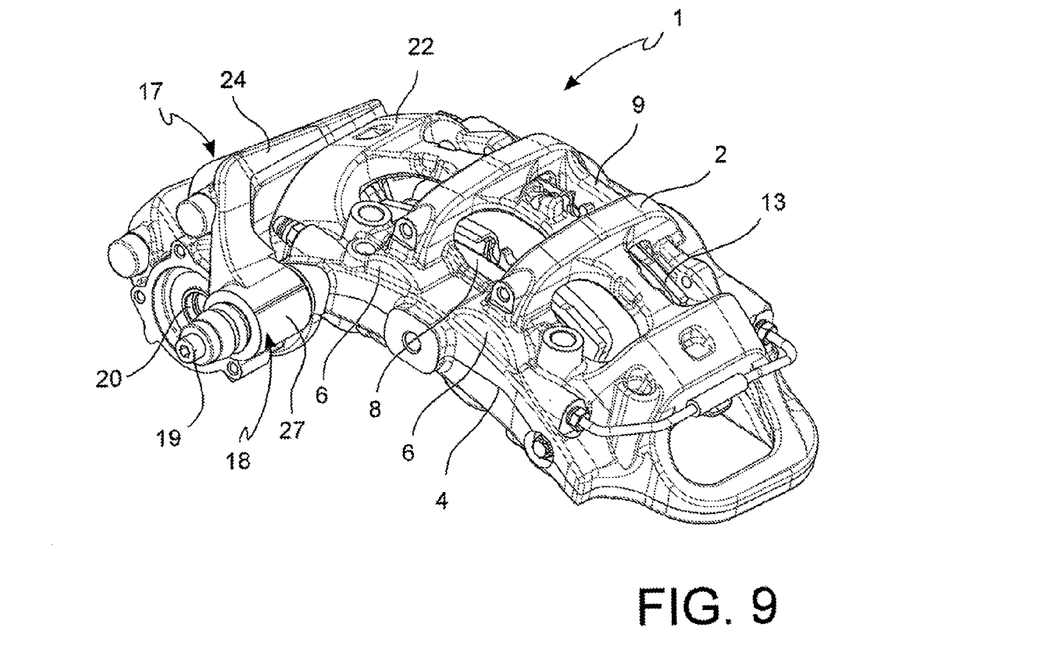
FIG. 9 shows, in an axonometric view from the wheel side, the assembly in FIG. 1.
Figure 10:
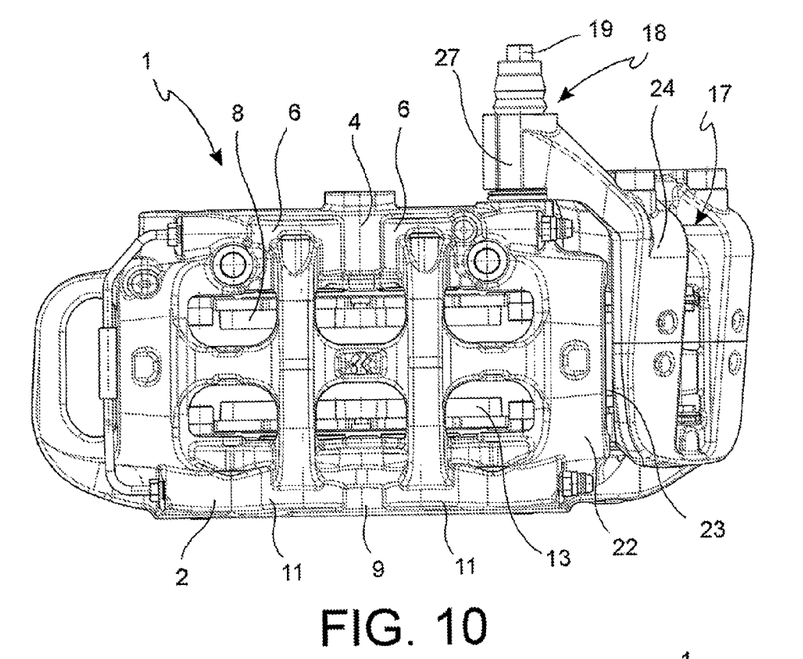
FIG. 10 shows a view from above of the assembly in FIG. 1.
Figure 11:
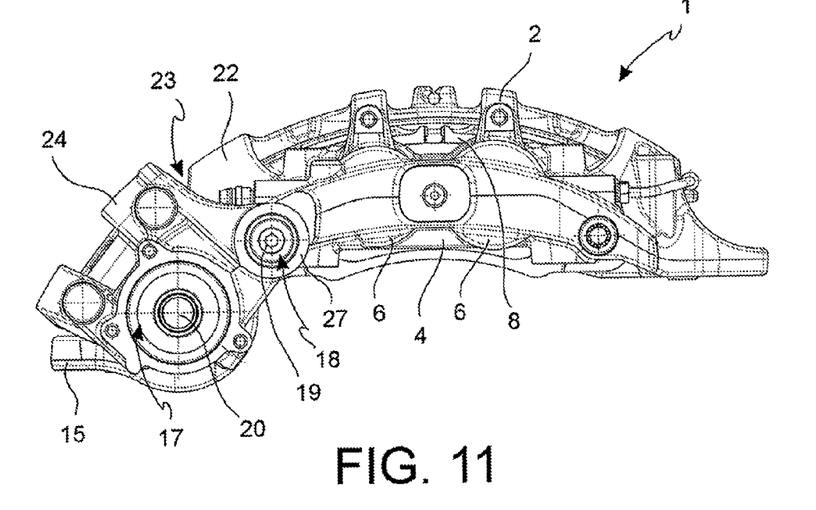
FIG. 11 shows a front view from the vehicle side of the assembly in FIG. 1.
Figure 12:
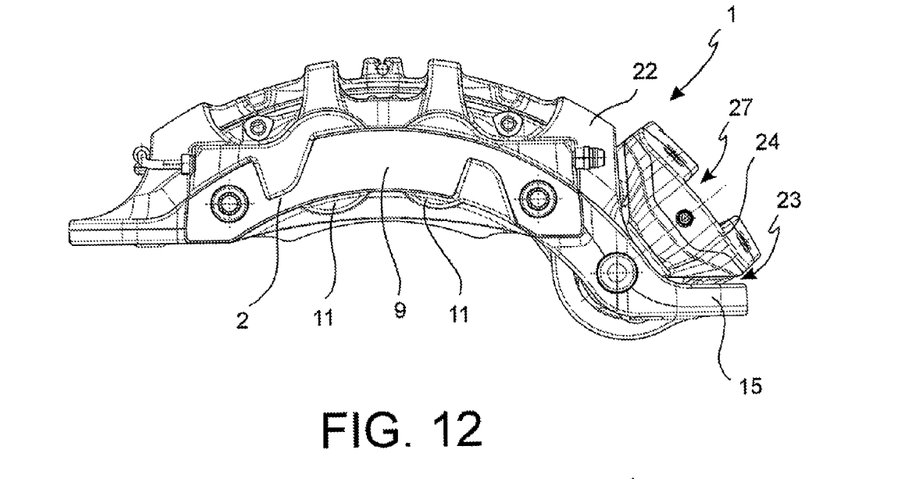
FIG. 12 shows a front view from the wheel side of the assembly in FIG. 1.
Figure 13:
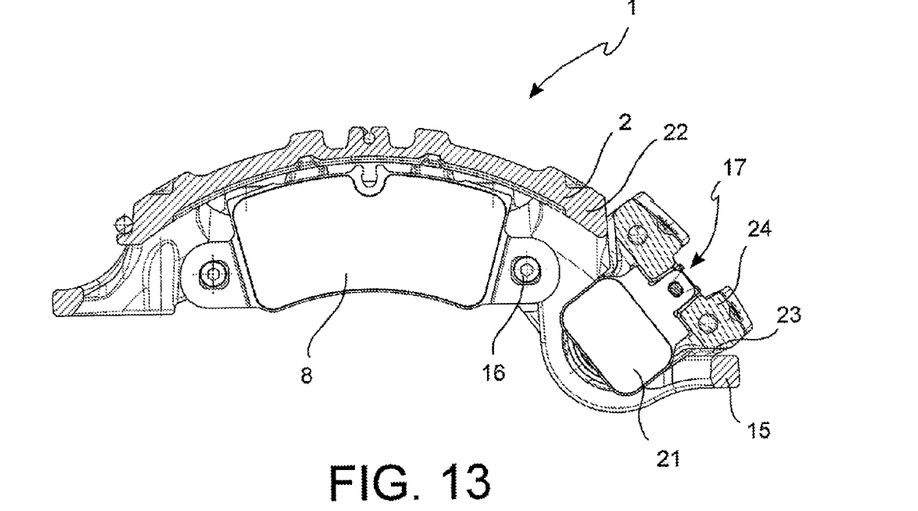
FIG. 13 shows a cross-section along a tangential plane passing through the centreline of the assembly in FIG. 1.
Figure 14:
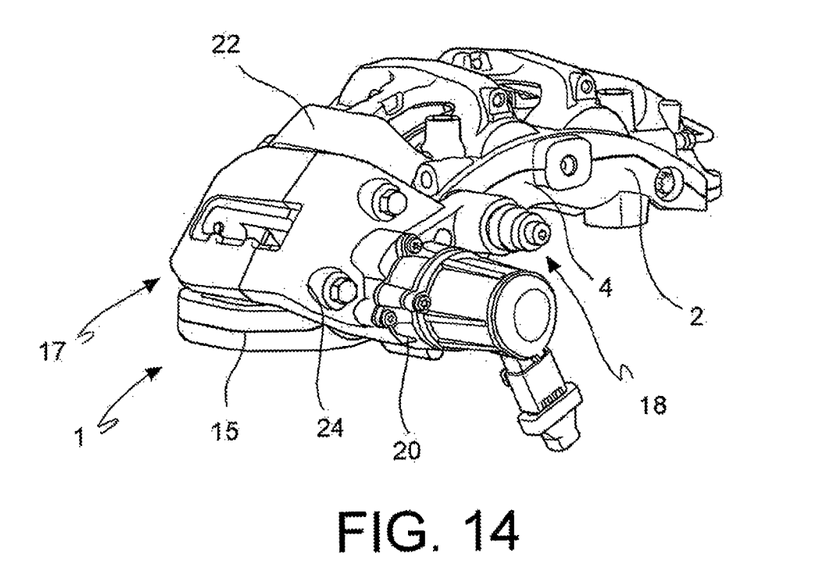
FIGS. 14 and 15 show in an axonometric view a service and parking caliper assembly respectively on the vehicle and wheel sides, in which an electrical type of actuation is connected to the parking caliper.
Figure 15:
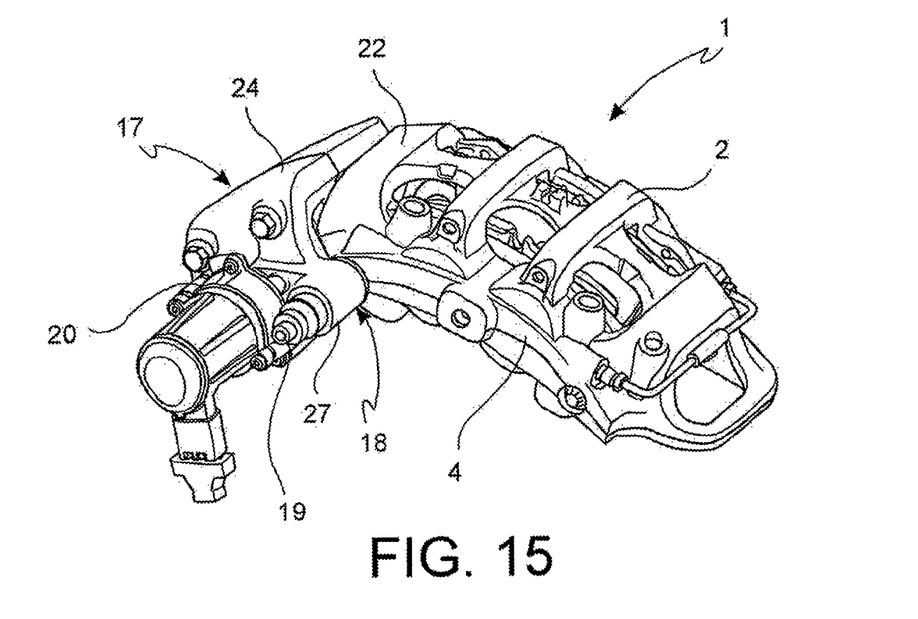
Figure 16:
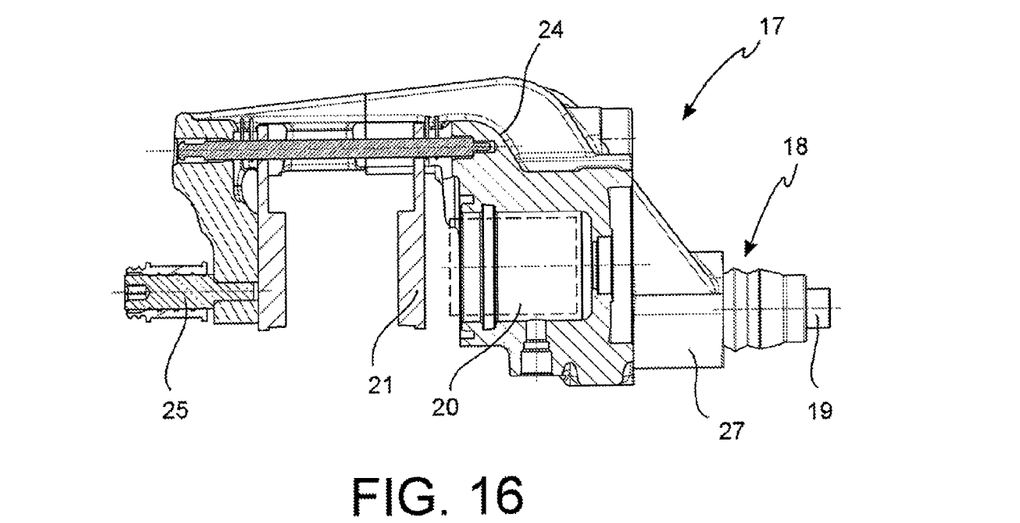
FIG. 16 shows a cross-section according to an axial radial plane of the parking caliper.
Figure 17:
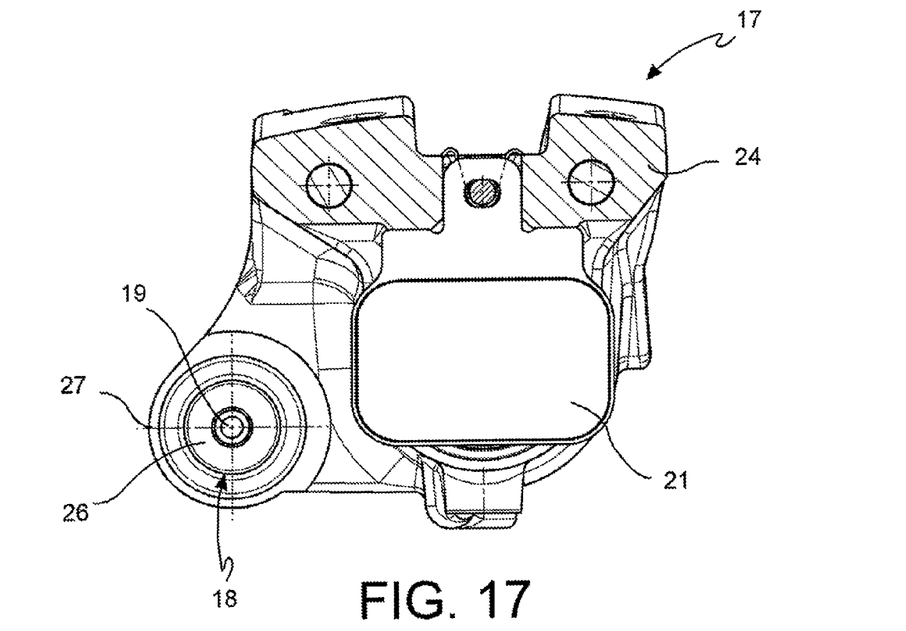
FIG. 17 shows a cross-section along a tangential plane of the centreline of the parking caliper.
Figure 18:
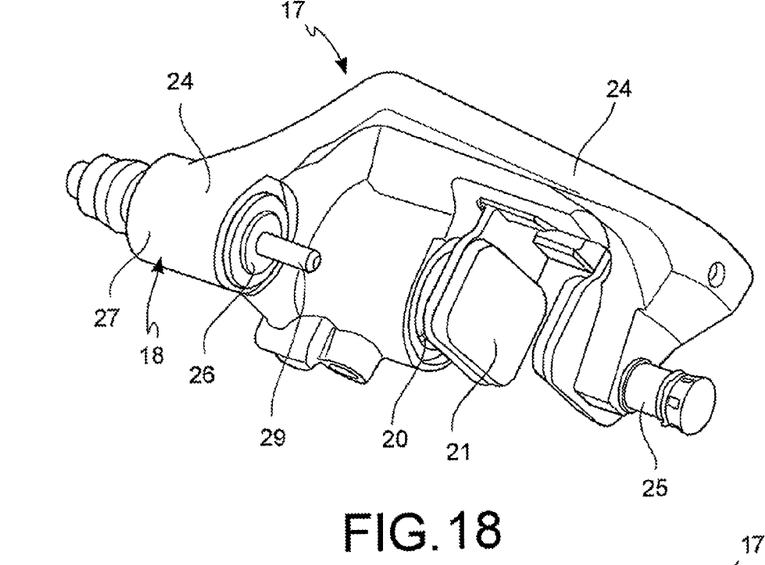
FIG. 18 shows, in an axonometric view from the wheel side, the parking caliper.
Figure 19:
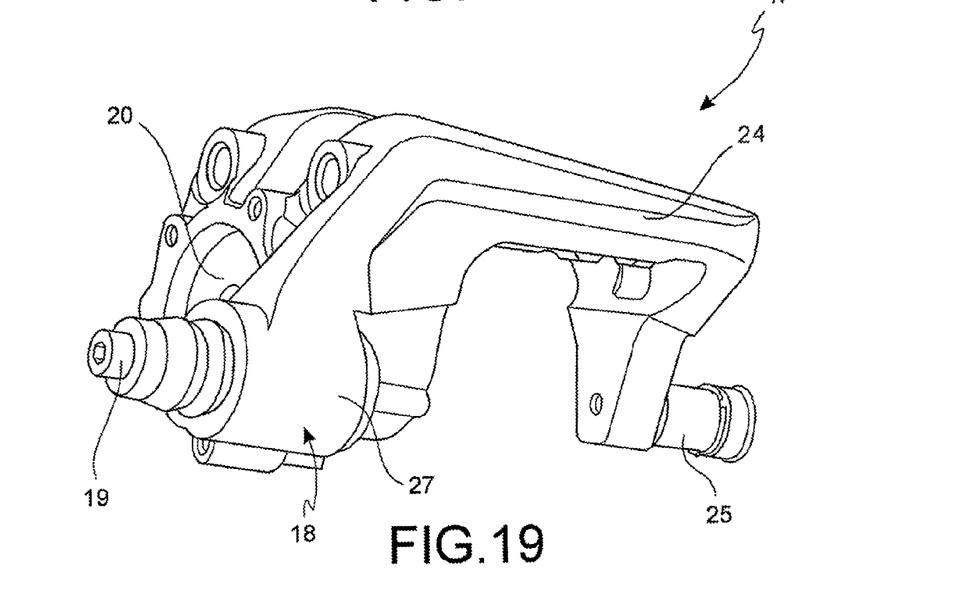
FIG. 19 shows, in an axonometric view from the vehicle side, the parking caliper without pads.
Figure 20:
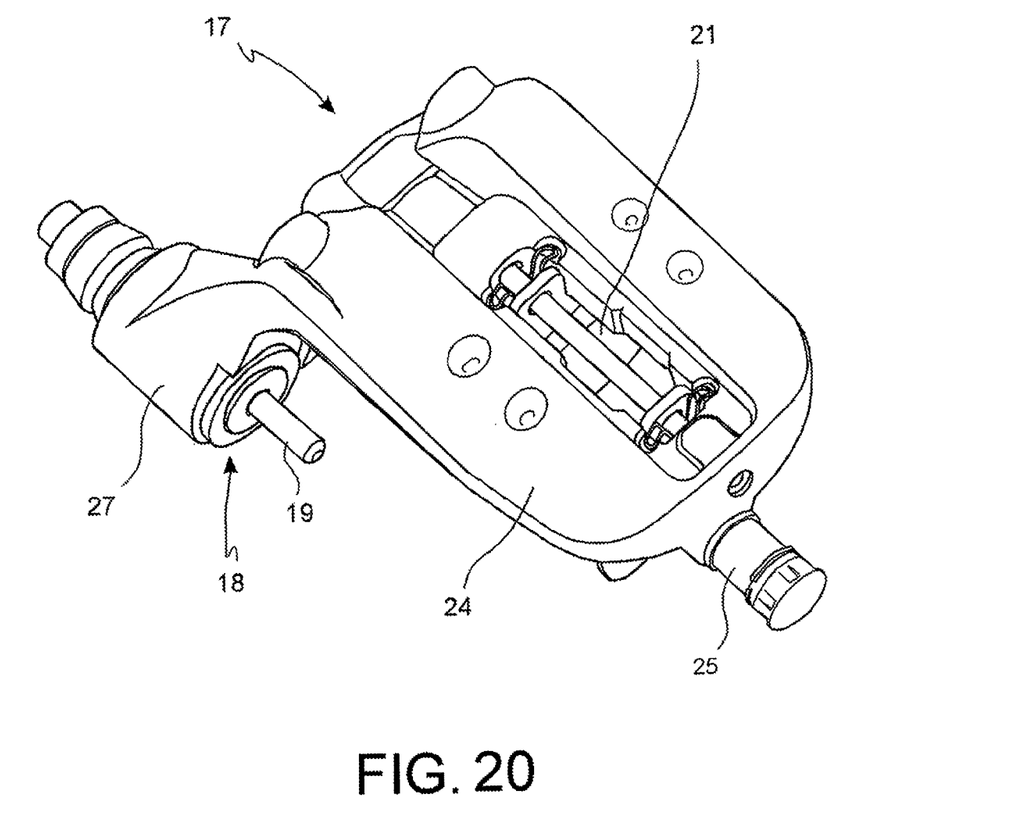
FIG. 20 shows, in an axonometric view from above, the parking caliper in FIG. 18.

With reference to the aforementioned figures, a caliper assembly for a service and parking disc brake 1 comprises a service caliper body 2 placed astride a disc for a disc brake 3.

Said body 2 comprises a first elongated element on the vehicle side 4 suitable for facing a first braking surface 5 of the brake disc 3.

Said first elongated element 4 comprises at least a first cylinder 6 which houses a first thrust piston 7 suitable for exercising a thrust action on a facing first service pad 8 to abut it against a first braking surface 5 of the disc 3 and exercise a service braking action on the vehicle.

In accordance with an embodiment, said first elongated element 4 comprises at least a first abutment and guide pin 16 of the first pad 8 to guide said pad 8 and receive the braking action of the vehicle.

In accordance with an embodiment, said service caliper body 2 further comprises a second elongated element on the wheel side 9 suitable for facing a second braking surface 10 of the brake disc 3.

Said second elongated element 9 comprises at least a second cylinder 11 which houses a second thrust piston 12 suitable for exercising a thrust action on a facing second service pad 13 to abut it against a second braking surface 14 of the disc 3 and exercise a service braking action on the vehicle.

In accordance with an embodiment, said service caliper body 2 comprises, in addition, at least a first bridge 15 suitable for connecting said first elongated element on the vehicle side 4 to said second elongated element on the wheel side 9.

In accordance with an embodiment, said assembly further comprises a parking caliper 17 comprising separate thrust means 20 of the parking caliper distinct from said first and second cylinder 6, 11 and suitable for abutting at least a third parking pad 21 against the first braking surface 5 of the disc 3.

In accordance with an embodiment, said parking caliper 17 has a connection 18 for supporting and connecting at least partially said parking caliper 17 to said service caliper body 2.

In accordance with an embodiment, said connection 18 of the parking caliper 17 to the service caliper body 2 comprises a first blocking screw 19 positioned coaxially to said first support and guide pin 16 of the first service pad 8.

In accordance with an embodiment, said service caliper body 2 comprises at least two bridges 15, 22 positioned adjacent to each other which leave between them an access window to the disc 23.

In accordance with an embodiment, said parking caliper 17 is positioned between said two adjacent bridges 15, 22.

In accordance with an embodiment, said parking caliper 17 is a floating parking caliper comprising a floating body 24, for example, but not necessarily, in a single piece or alternatively in two separable pieces firmly connected to each other, which moves by sliding on guides 19, 25 attached to the service caliper body 2 which acts as a bracket for said floating body 24.

In accordance with an embodiment, said first blocking screw acts as a first guide 19 of said floating body 24.

In accordance with an embodiment, a guide bush 26 suitable for receiving the floating body 24 is fitted onto said first blocking screw 19.

In accordance with an embodiment, said guide bush 26 receives, in such a way as to be free to slide, an attachment portion 27 of the floating body 24.

In accordance with an embodiment, said parking caliper 17 comprises a floating caliper body 24 supported in a sliding manner on said service caliper body 2 which acts as a bracket for said floating body 24.

In accordance with an embodiment, said floating body 24 slides on a second guide 25 placed on the opposite side of the floating body 24 in relation to the first guide 19 comprising said blocking screw.

In accordance with an embodiment, said second guide 25 is connected to the elongated element on the wheel side 9 of the service caliper body 2.

In accordance with an embodiment, said first abutment and guide pin 16 of the first pad 8 has a stem 28 eternally threaded and housed in a threaded seat 29 provided in the first elongated element on the wheel side 4.

In accordance with an embodiment, said abutment and guide pin 16 of the first pad 8 has a hollow and internally threaded stem 28 to house a threaded end 30 of the first blocking screw 19.

In accordance with an embodiment, said first blocking screw 19 has a stem which projects so as to overhang from said first elongated element on the vehicle side 4 to form a sliding guide for the floating body 24 of the parking caliper 17.

In accordance with an embodiment, a guide bush 26 protected by dust covers 31 is positioned between the floating body 24 and the first blocking screw 19.

Obviously, a person skilled in the art may make numerous modifications and variations to the brake caliper body according to the invention so as to satisfy contingent and specific requirements while remaining within the sphere of protection of the invention as defined by the following claims.

REFERENCES

| | |
|---|---|
| 1. | assembly |
| 2. | service caliper body |
| 3. | disc for disc brake |
| 4. | elongated element vehicle side |
| 5. | first braking surface vehicle side of disc |
| 6. | first cylinder |
| 7. | first piston |
| 8. | first pad |
| 9. | second elongated element wheel side |
| 10. | second braking surface |
| 11. | second cylinder |
| 12. | second thrust piston |
| 13. | second service pad |
| 14. | second braking surface |
| 15. | first bridge |
| 16. | first pad guide abutment pin |
| 17. | parking caliper |
| 18. | connection |
| 19. | first blocking screw |
| 20. | separate parking thrust means |
| 21. | third parking pad |
| 22. | second bridge adjacent to service caliper body |
| 23. | window between bridges |
| 24. | floating body parking caliper |
| 25. | second floating body sliding guide |
| 26. | sliding bush on first blocking screw |
| 27. | attachment portion of the floating body to the bush |
| 28. | stem of first pad guide pin |
| 29. | threaded seat for pin stem |
| 30. | threaded end of first blocking screw |
| 31. | dust cover |

The invention claimed is:

1. An assembly of service and parking caliper for disc brake comprising:
   a service caliper body arranged astride of a disc for disc brake having a first vehicle side elongated element suitable for facing a first braking surface of the brake disc, said first elongated element comprising at least a first cylinder housing a first thrust piston suitable for exerting a thrust action of a faced first service pad for abutting it against a first braking surface of the disc and exerting a service braking action of the vehicle;
   said first elongated element comprising at least a first pin of the first service pad for guiding the first service pad and receiving the braking action of the vehicle;
   said service caliper body further comprising a second wheel side elongated element suitable for facing a second braking surface of the brake disc, said second elongated element comprising at least a second cylinder housing a second thrust piston suitable for exerting a thrust action on a second faced service pad for abutting the second faced service pad against a second braking surface of the brake disc and exerting a service braking action of the vehicle;
   said service caliper body further comprises at least a first bridge suitable for connecting said first vehicle side elongated element said second wheel side elongated element;
   said assembly further comprises:
   a parking caliper comprising separated thrust means of the parking caliper separated from said first and second cylinder and suitable for abutting at least a third parking pad against the first braking surface of the disc;
   said parking caliper has a connection connecting and supporting at least partially said parking caliper to said service caliper body; wherein
   said connection of the parking caliper to the service caliper body comprises a first locking screw connected coaxially to said first pin for supporting and guiding the first service pad.

2. The assembly according to claim 1, wherein said service caliper body comprises at least two bridges arranged adjacent to one another leaving between them a window for accessing the disc wherein
   said parking caliper is arranged between said adjacent bridges.

3. The assembly according to any to claim 1, wherein said parking caliper is a floating parking caliper comprising a floating body, in a single piece or in two pieces firmly connected to one another, which moves by sliding on rails fastened to the service caliper body serving as a bracket for said floating body.

4. The assembly according to claim 3, wherein said first locking screw serves as a first rail of said floating body, wherein a guiding bush suitable for receiving the floating body is put on said first locking screw, wherein
   said guiding bush receives an attachment portion of the floating body, which is free to slide.

5. The assembly according to claim 1, wherein said parking caliper comprises a floating caliper body slidably supported on said service caliper body serving as a bracket for said floating body, wherein said floating body slides on a second rail arranged on the opposite side of the floating body with respect to the first rail comprising said locking screw, wherein
   said second rail is connected to the wheel side elongated element of the service caliper body.

6. The assembly according to claim 1, wherein said first pin of the first service pad has an externally threaded stem received in a threaded seat provided in the first vehicle side elongated element, wherein
   said first pin of the first service pad has a hollow stem internally threaded for housing a threaded end of the first locking screw.

7. The assembly according to claim 1, wherein
   said first locking screw has a stem projecting cantilevered from said first vehicle side elongated element to form a sliding rail for the floating body of the parking caliper, wherein
   between the floating body and the first locking screw a guiding bush protected by anti-dust caps, is interposed.

* * * * *